United States Patent
Iguchi et al.

(10) Patent No.: US 8,190,178 B2
(45) Date of Patent: May 29, 2012

(54) CELLULAR PHONE AND MOBILE SWITCHING CONTROLLER

(75) Inventors: Michio Iguchi, Yokohama (JP); Arata Nakagoshi, Yokohama (JP); Ichiro Kohashi, Yokohama (JP); Tsutomu Sano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 103 days.

(21) Appl. No.: 12/685,561

(22) Filed: Jan. 11, 2010

(65) Prior Publication Data

US 2010/0113071 A1 May 6, 2010

Related U.S. Application Data

(63) Continuation of application No. 11/521,612, filed on Sep. 15, 2006, now abandoned.

(30) Foreign Application Priority Data

Dec. 9, 2005 (JP) .................. 2005-356197

(51) Int. Cl.
*H04W 4/00* (2009.01)
(52) U.S. Cl. ............... 455/462; 455/425; 455/422.1; 455/426.1; 455/426.2; 455/445; 455/461; 455/465
(58) Field of Classification Search .......... 455/425, 455/462, 422.1, 426.1, 426.2, 445, 461, 465
See application file for complete search history.

(56) References Cited

U.S. PATENT DOCUMENTS

| 5,007,000 | A |   | 4/1991 | Baldi |
|---|---|---|---|---|
| 5,379,339 | A | * | 1/1995 | Sakamoto ............... 455/461 |
| 5,666,401 | A | * | 9/1997 | Morganstein et al. ....... 379/67.1 |
| 5,995,843 | A | * | 11/1999 | Sjodin et al. ............... 455/462 |
| 6,032,034 | A | * | 2/2000 | Rabina et al. ............... 455/401 |
| 7,395,068 | B2 |   | 7/2008 | Sylvain |
| 2004/0224670 | A1 |   | 11/2004 | Hull et al. |

FOREIGN PATENT DOCUMENTS

JP 6-62455 3/1994

OTHER PUBLICATIONS

"Best Plan for Phone Number," Nikkei Communications, Nikkei BP, May 15, 2005, p. 50, Fig. 8.

* cited by examiner

*Primary Examiner* — Justin Lee
(74) *Attorney, Agent, or Firm* — McDermott Will & Emery LLP (57) ABSTRACT

In a case where a cellular phone exists outside a WOS system service area, the cellular phone receives a not-connectable signal and an audio message from a mobile switching controller. The cellular phone conducts disconnection processing with the not-connectable signal as a turning point. Moreover, the cellular phone stores an extension number and converts a dedicated special number into an external number for retransmission, thus establishing connection to a PBX. After the reception of a connection-accepted signal and an automatic exchange answer message from the PBX, the cellular phone automatically transmits the stored extension number.

2 Claims, 7 Drawing Sheets

| CONVERSION TABLE ||| 300 |
|---|---|---|---|
| CALLING CELLULAR PHONE NUMBER | DEDICATED SPACIAL NUMBER | EXTERNAL NUMBER | |
| 090-1212-3434 | *55 | 045-999-9999 | |
| 301 | 302 | 303 | |

CELLULAR PHONE AND MOBILE SWITCHING CONTROLLER

RELATED APPLICATIONS

This application is a Continuation of U.S. application Ser. No. 11/521,612, filed on Sep. 15, 2006 now abandoned, claiming priority of Japanese Patent Application No. 2005-356197, filed on Dec. 9, 2005, the entire contents of each of which are hereby incorporated by reference.

BACKGROUND OF THE INVENTION

The present invention relates to a cellular phone and a mobile switching controller, and more particularly to a cellular phone and a mobile switching controller for use in an in-office internal phone system.

WOS (Wireless Office Service) systems have been known as a system using a cellular phone as an in-office internal phone. A WOS system is designed such that a base transceiver subsystem (BTS) for the WOS system is installed in a limited space such as in an office or in a school to be connected to a private branch exchange (PBX), and a cellular phone is registered in the WOS system, thereby using the cellular phone as an internal phone within a communication service area of the WOS system and enabling connection to the in-office internal phone in response to a transmission of an extension number from the cellular phone. In the WOS system, a caller, who exists within the service area of the WOS system, can input a dedicated special number at a position before the extension number and then transmit it to call a partner, who is an object of connection, through a base transceiver subsystem of the WOS system irrespective of whether the partner exists inside or outside the WOS system service area. On the other hand, in a case where the caller exists outside the WOS system service area, the caller first makes a telephone call to a general pilot number of that company and, after the automatic answering "dial an extension number" from the PBX, dials the extension number for connection, thus making a calling access to the cellular phone corresponding to this extension number (see "Best Plan for Phone Number", NIKKEI COMMUNICATIONS, NIKKEI BP, May 15, 2005, Page 50, FIG. 8).

JP-A No. (HEI) 06-062455 and U.S. Pat. No. 5,379,339 disclose a wireless phone apparatus having a ROM for storing an extension call number and an outside-line call number for a cellular phone in a state associated with each other. This wireless phone apparatus is made to output a DTMF (Dual Tone Modified Frequency) code corresponding to the outside-line call number stored in the aforesaid ROM from a DTMF code memory to an audio codec unit when a cellular phone under an extension call specification by a key operation in a key inputting unit is out of calling area. Thus, a DTMF signal corresponding to the outside-line is outputted from a line interface unit to achieve a calling access to the cellular phone.

Moreover, for connection to an internal phone from the interior of the WOS system service area, the caller can put a dedicated special number at a position before a connection-accepting side extension number and transmit it. Still moreover, for connection to an internal phone from outside the WOS system service area, the caller needs to once make calling through the outside line to establish connection to the PBX and then input an extension number after an automatic exchange answer message from the PBX. It is necessary to use numbers properly between the interior and exterior of the service area, which incurs a disadvantage of complicating key operations for extension connection.

In a case where a caller stays within a service area, the technique disclosed in JP-A No. Hai 06-062455 or U.S. Pat. No. 5,379,339 realizes a method of, even if a connection partner is out of a system service area, establishing connection through the same calling operation as that to be conducted when the connection partner stays within the service area. However, no consideration is given to a calling method to be carried out when the caller is out of the service area.

SUMMARY OF THE INVENTION

The present invention has been developed with a view to solving the above-mentioned problems, and it is therefore an object of the invention to provide a. cellular phone and a mobile switching controller (MSC), capable of establishing connection to an in-office internal phone system in a manner that, irrespective of whether or not a cellular phone of a caller exists within a WOS system service area, the caller uses the same number and conducts the same calling operation.

A caller inputs a dedicated special number at a position before an extension number which is an object of connection and transmits it. At this time, the inputted extension number is stored in a memory of the cellular phone. In the case of the caller being out of a service area of a WOS system, the caller receives a not-connectable signal and an audio message from a mobile switching controller. The cellular phone carries out disconnection processing in response to the not-connectable signal and converts the dedicated special number into an external number and retransmits the external number to make connection to the PBX. Upon receipt of the reception of a connection-accepted signal and an automatic exchange answer message from the PBX, the cellular phone automatically transmits the stored extension number for enabling connection to the internal phone.

A cellular phone according to the present invention includes a memory for storing an extension number inputted and a conversion table for converting a dedicated special number into an external number, and has a function to, after the reception of a not-connectable signal from a mobile switching controller, automatically carry out disconnection processing with respect to the switching controller and conduct retransmission through the use of an external number in the conversion table, a function to, after the reception of a connection-accepted signal at the connection to the PBX, transmit an extension number stored in the memory of the cellular phone and a message displaying function to prevent a caller from operating the cellular phone in the middle of an audio guidance at the connection to the mobile switching controller or the PBX.

BRIEF DESCRIPTION OF THE DRAWINGS

Preferred Embodiments of the present invention will now be described in conjunction with the accompanying drawings, in which.

DESCRIPTION OF THE PREFERRED EMBODIMENTS

Modes for carrying out the present invention will be described hereinbelow through embodiments with reference to the drawings. The same parts will be designated at the same reference numerals, and the repeated description thereof will be omitted for brevity.

First Embodiment

Figure 1:
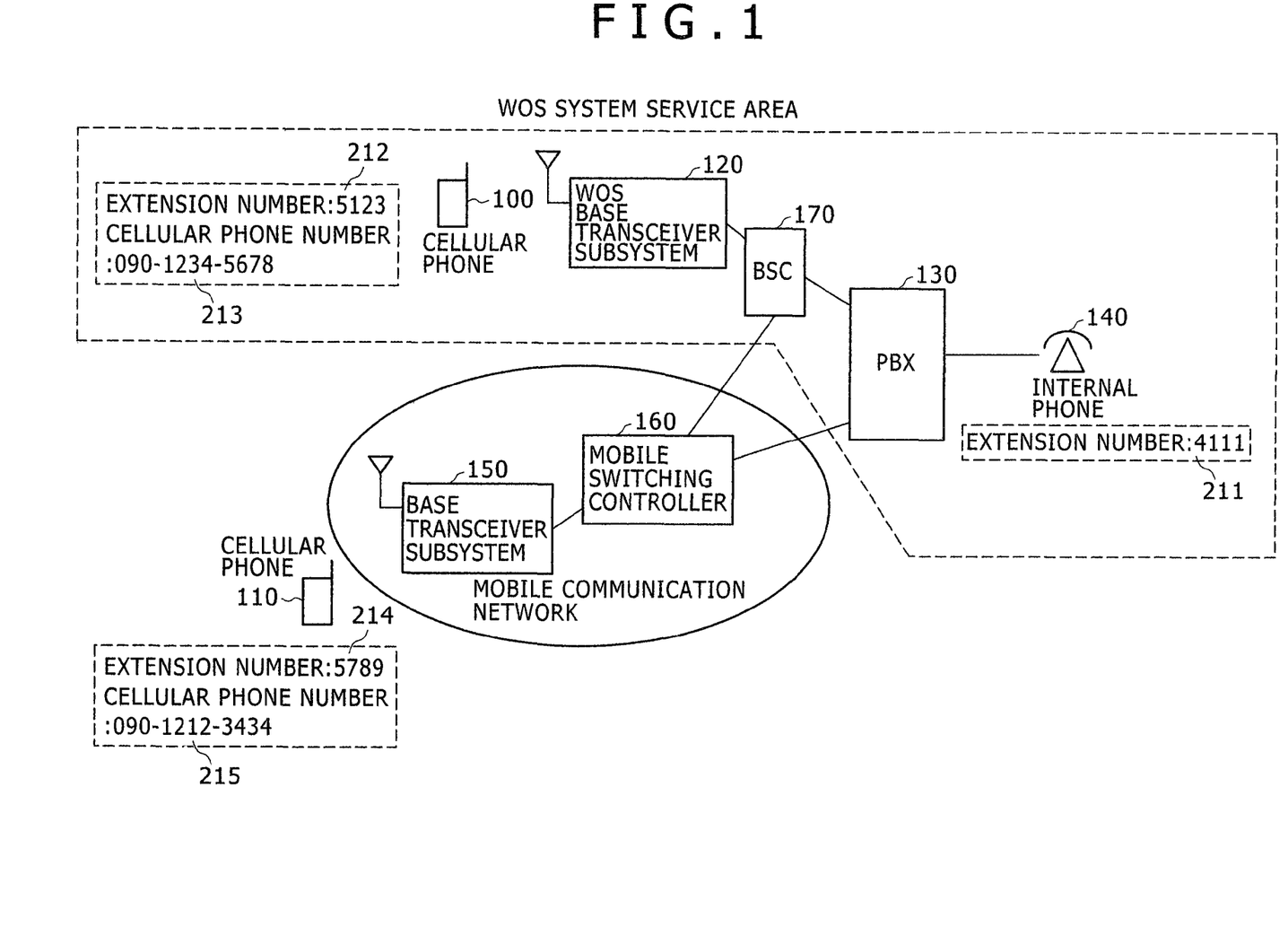
FIG. 1 is a block diagram for explaining a WOS system and a mobile communication network.
Figure 2:
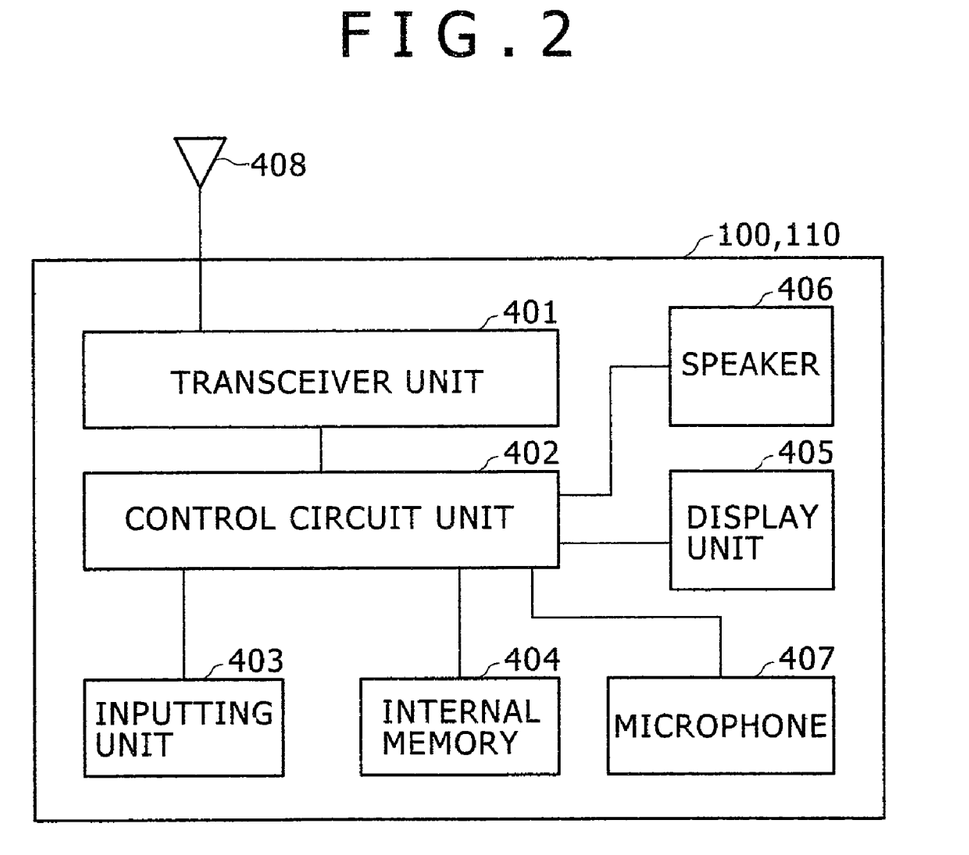
FIG. 2 is a block diagram showing a cellular phone.
Figure 3:
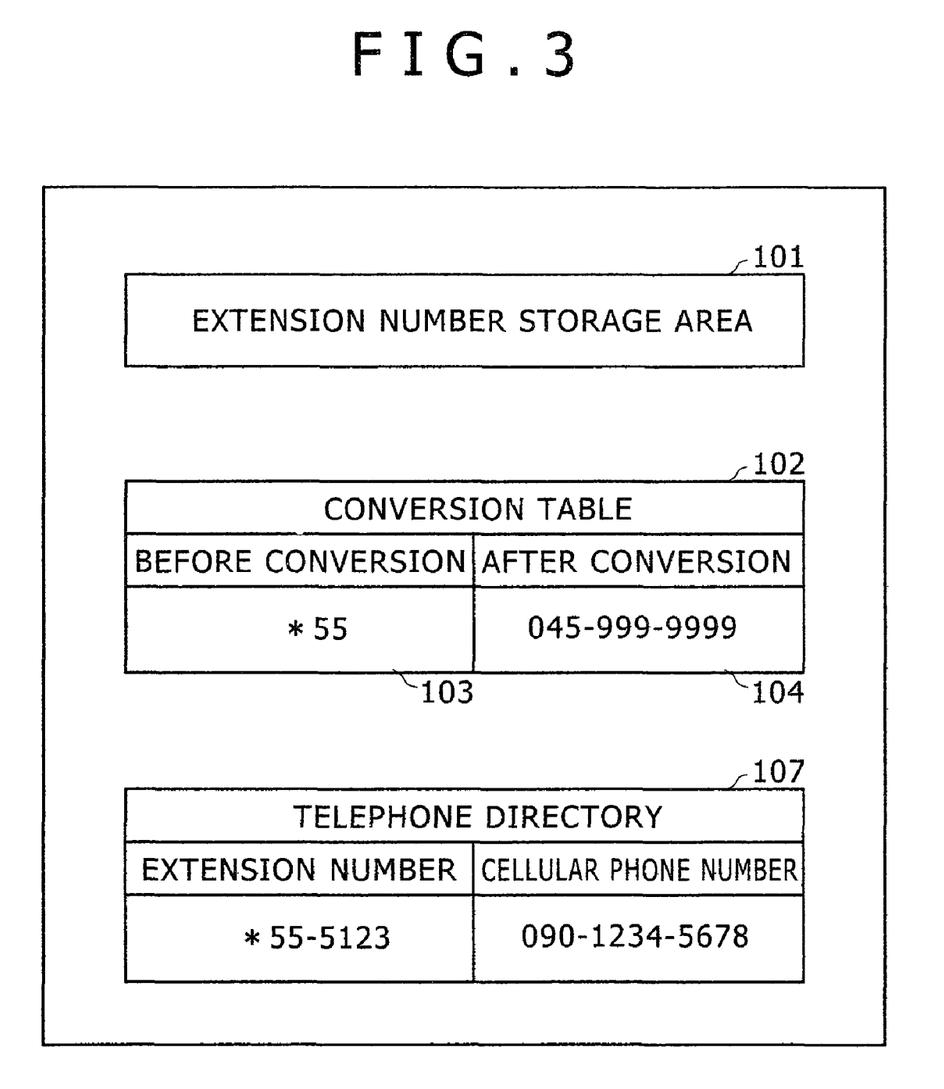
FIG. 3 is an illustration for explaining the contents to be held in a memory of a cellular phone.
Figure 4:
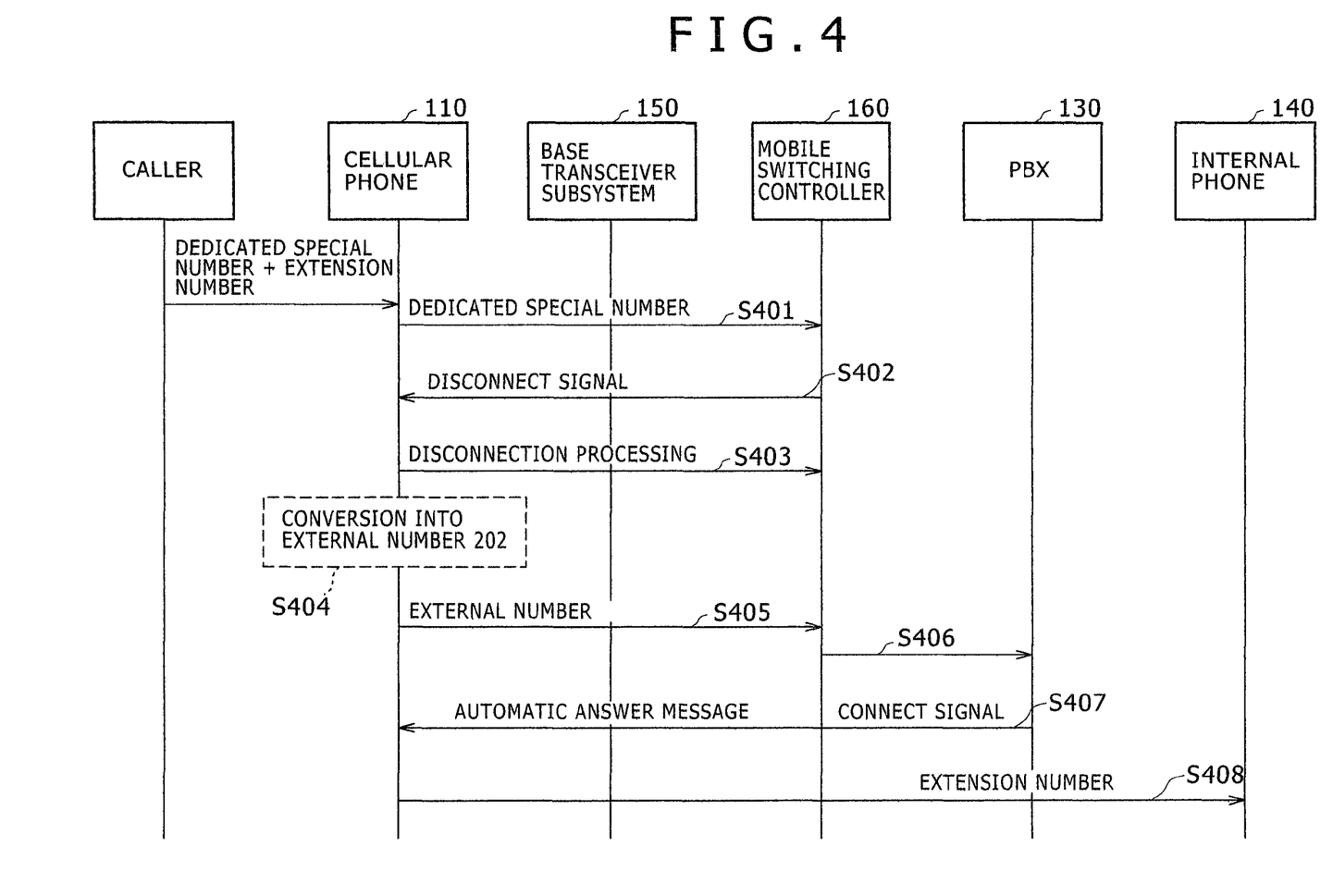
FIG. 4 is an illustration of a sequence among a cellular phone, a base transceiver subsystem, a mobile switching controller, a PBX and a fixed internal phone.
Figure 5:
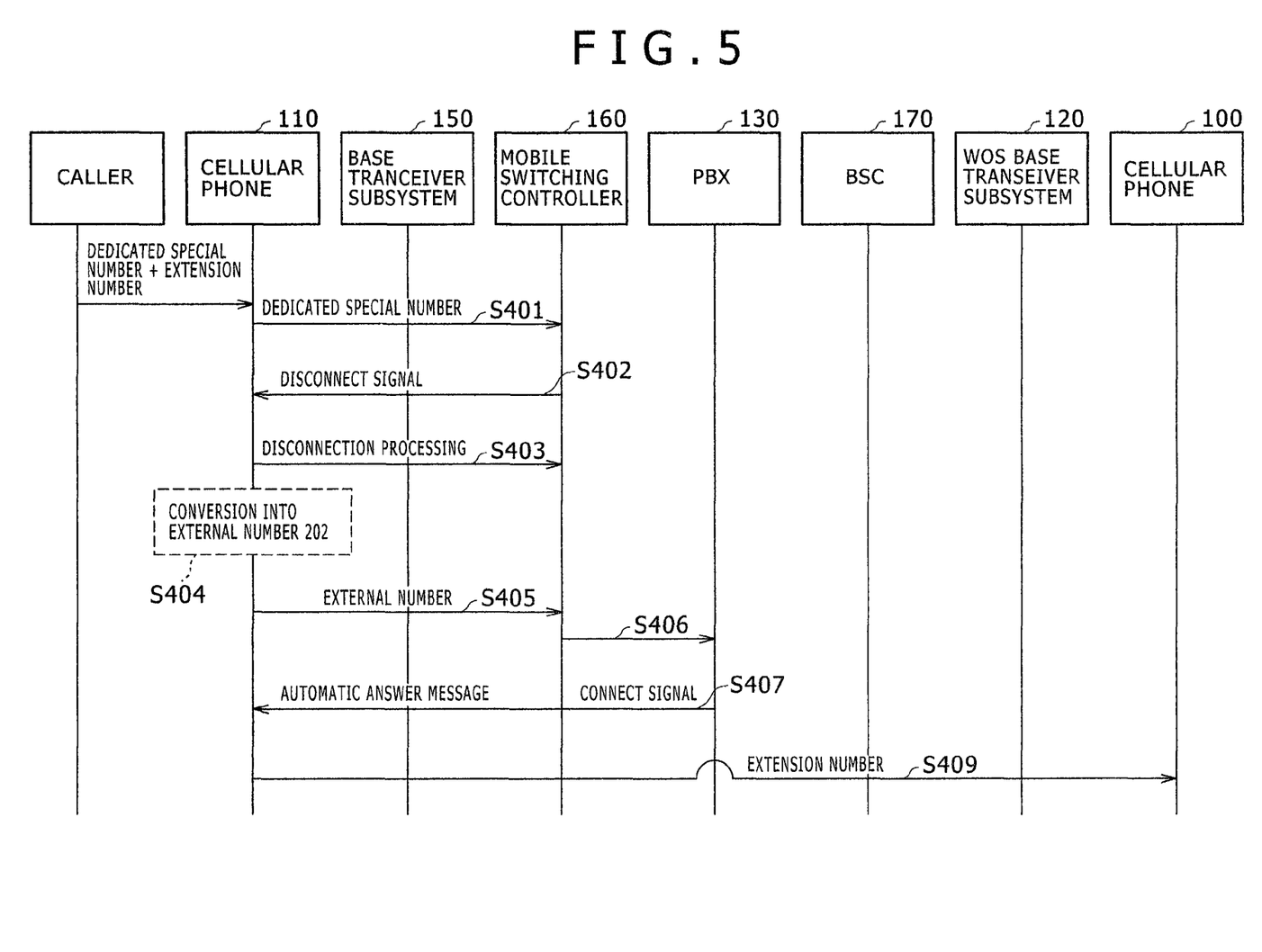
FIG. 5 is an illustration of a sequence among a cellular phone, a base transceiver subsystem, a mobile switching controller, a PBX, a BSC, a WOS base transceiver subsystem and a WOS cellular phone.

A first embodiment will be described with reference to FIGS. 1 to 5. FIG. 1 is a block diagram for explaining a WOS system and a mobile communication network. FIG. 2 is a block diagram showing a cellular phone. FIG. 3 is an illustration for explaining the contents to be held in a memory of a cellular phone. FIG. 4 is an illustration of a sequence among a cellular phone, a base transceiver subsystem, a mobile switching controller, a PBX and a fixed internal phone. FIG. 5 is an illustration of a sequence among a cellular phone, a base transceiver subsystem, a mobile switching controller, a PBX, a BSC, a WOS base transceiver subsystem and a WOS cellular phone.

In FIG. 1, a Was system is made up of a WOS base transceiver subsystem 120 for carrying out the transmission/reception of radio signals to/from a cellular phone 100, a BSC (Base Station Controller) 170 for controlling the WOS base transceiver subsystem 120, a PBX 130 serving as a private phone branch exchange, and an in-office internal phone 140. A mobile communication network is composed of a base transceiver subsystem 150 for carrying out the transmission/reception of radio signals to/from a cellular phone 110 brought out from a service area of the WOS system, and a mobile switching controller 160. The PBX 130 is connected to the BSC 170 and further to the mobile switching controller 160.

Each of the cellular phones 100 and 110 is a telephone which is of a type for a WOS system service. Accordingly, the cellular phone 100 has a cellular phone number (in this case, 090-1234-5678) 213 and an extension number (in this case, 5123) 212. Likewise, the cellular phone 110 has a cellular phone number (in this case, 090-1212-3434) 215 and an extension number (in this case, 5789) 214. Moreover, an internal phone has only an extension number (in this case, 4111) 211.

In FIG. 2, the cellular phone 100/110 includes a transceiver 401 for carrying out the transmission/reception of radio signals, a control circuit unit 402 for executing signal conversion and entire control, an inputting unit 403 for conducting operations such as number input and calling, an internal memory 404, a display unit 405 for making a display, a speaker 406 used for output of an audio message and for audio reception, a microphone 407 used for audio transmission, and an antenna 408 connected to the transceiver 401.

Referring to FIG. 3, a description will be given hereinbelow of data provided in the internal memory 404 of the cellular phone 110. The internal memory 404 holds an extension number storage area 101 for storing an extension number temporarily, a conversion table 102 for converting a dedicated special number into an external number, and a telephone directory 107 having an extension number and a cellular phone number in a state associated with each other. The use of the conversion table 102 accomplishes conversion of a number registered as a before-conversion number 103 into a number registered as an after-conversion number 104. Although only one record is written in this case, the telephone directory 107 usually has plural records. When a communication partner does not exist within a WOS system service area, the telephone directory 107 is used for conversion of an extension number of the communication partner into a cellular phone number.

The caller, who is a user of the cellular phone 110, previously registers a dedicated special number 210 (in this case, *55) as a before-conversion number 103 of the conversion table 102 and an external number 220 (in this case, 045-999-9999) corresponding to the dedicated special number as the after-conversion number 104. In this case, the external number 220 signifies the number of the PBX 130 shown in FIG. 1.

With reference to FIG. 4, a description will be given hereinbelow of a case where connection is made from the cellular phone 110 outside the WOS system service area to the internal phone 140. The caller who possesses the cellular phone 110 inputs the dedicated special number (*55) and the extension number 211 (4111) of the internal phone 140 to the key inputting unit 403 of the cellular phone 110 and sends it. At this time, the cellular phone 110 stores the extension number 211 in the extension number storage area 101 provided in the internal memory 404. The transmission thereof makes connection of the cellular phone 110 through the base transceiver subsystem 150 to the mobile switching controller 160 (S401). Since the dedicated special number does not specify the reception destination, the mobile switching controller 160 transmits an audio guidance indicative of a not-connectable state and a DISCONNECT signal to the cellular phone 110 (S402). Upon receipt of the DISCONNECT signal, the cellular phone 110 carries out disconnection processing to once cut off the connection to the mobile switching controller 160 (S403). The cellular phone 110 makes reference to the conversion table 102 provided in the memory 404 so as to convert the dedicated special number (*55) registered as the before-conversion number 103 into the external number (for example, 045-999-9999) registered as the after-conversion number 104 (S404), and retransmits it (S405).

After the above-mentioned operations, the cellular phone 110 is connected through the base transceiver subsystem 150 and the mobile switching controller 160 to the PBX 130 (S406). The PBX 130 transmits an automatic answer exchange message and a CONNECT signal (S407) to the cellular phone 110. Upon receipt of the CONNECT signal, the cellular phone 110 transmits the extension number 211 (4111) stored in the cellular phone extension number storage area 101 at the calling. The PBX 130 calls the internal phone 140 with the extension number 211 (4111), thereby establishing connection between the cellular phone 110 and the internal phone 140 (S408).

Referring to FIG. 5, a description will be given hereinbelow of a case where connection is made from the cellular phone 110 outside the WOS system service area to the cellular phone 100 registered in the WOS system. The caller, who possesses the cellular phone 110, inputs the dedicated special number 210 (*55) and the extension number 212 (in this case, 5123) of the cellular phone 100 to the cellular phone key inputting unit 403 and sends it. At this time, the extension number 212 (5123) is stored in the extension number storage area 101 prepared in the cellular phone internal memory 404. The transmission thereof makes connection of the cellular phone 110 through the base transceiver subsystem 150 to the mobile switching controller 160 (S401). Since the dedicated special number does not specify the reception destination, the mobile switching controller 160 transmits an audio guidance indicative of a not-connectable state and a DISCONNECT signal 230 to the cellular phone 110 (S402). Upon receipt of the DISCONNECT signal 230, the cellular phone 110 carries out disconnection processing 231 to once cut off the connection to the mobile switching controller 160 (S403). The cellular phone 110 makes reference to the conversion table 102 provided in the memory 404 so as to convert the dedicated special number 210 (*55) registered as the before-conversion number 103 into the external number 220 (for example, 045-999-9999) registered as the after-conversion number 104 (S404), and retransmits it (S405). After the above-mentioned operations, the cellular phone 110 is connected through the base transceiver subsystem 150 and the mobile switching controller 160 to the PBX 130 (S406). The PBX 130 transmits an automatic answer exchange message 221 and a CONNECT signal 222 (S407) to the cellular phone 110. The next operation from when the PBX 130 transmits an automatic answer exchange message 221 and a CONNECT signal 222 until the cellular phone 110 receives them is the same as that described above with reference to FIG. 4, and the description thereof will be omitted for simplicity.

Upon receipt of the CONNECT signal 222, the cellular phone 110 transmits the extension number 212 (5123) stored in the cellular phone extension number storage area 101 at the calling. The PBX 130 makes connection to the BSC 170 to call the cellular phone 100 via the WOS base transceiver subsystem 120, thus establishing connection between the cellular phone 110 and the cellular phone 100 (S409).

A description will be given hereinbelow of a modification of the case where connection is made from the cellular phone 110 outside the WOS system service area to the cellular phone 100 registered in the WOS system. In the cellular phone 110, the extension number 212 (in this case, 5123) of the cellular phone 100 and the cellular phone number 213 (in this case, 090-1234-5678) are registered in advance in the telephone directory 107. The caller, who possesses the cellular phone 110, inputs the dedicated special number 210 (*55) and the extension number 212 (5123) of the cellular phone 100 to the cellular phone key inputting unit 403 and sends it. The cellular phone 110 is connected via the base transceiver subsystem 150 to the mobile switching controller 160. The mobile switching controller 160 transmits an audio guidance indicative of a not-connectable state and a DISCONNECT signal 230 to the cellular phone 110. Upon receipt of the DISCONNECT signal 230, the cellular phone 110 carries out disconnection processing 231 to cut off the connection to the mobile switching controller 160. Moreover, the cellular phone 110 makes reference to the telephone directory 107 to conduct conversion into the cellular phone number 213 (in this case, 090-1234-5678) of the cellular phone 100 and resends it. Thus, the cellular phone 110 is connected through the base transceiver subsystem 150, the mobile switching controller 160, the BSC 170 and the WOS base transceiver subsystem 120 to the cellular phone 100. In this configuration, attention should be paid to the point that the connection is not made through the PBX 130, for that the mobile switching controller 160 is directly connected to the BSC 170 as shown in FIG. 1.

In a case where, as a response at the connection to the PBX 130, the PBX 130 transmits only an automatic answer exchange message 221, the extension number 211 stored in the Internal memory 101 of the cellular phone 110 is automatically transmitted after sending the external number 220 from the cellular phone 110, thereby enabling the connection of the cellular phone 110 to the internal phone 140.

It is also appropriate that, at the first calling after the addition of the dedicated special number 210 before the extension number, the cellular phone display unit 405 displays a message such as "in reconnection" so that the caller does not react to an audio message such as "the number you have called is not in use" generated from the switching controller 160, or that the speaker 406 generates an audio message. Moreover, an automatic answer message during the reconnection can also be handled in a similar manner.

Second Embodiment

Figure 6:
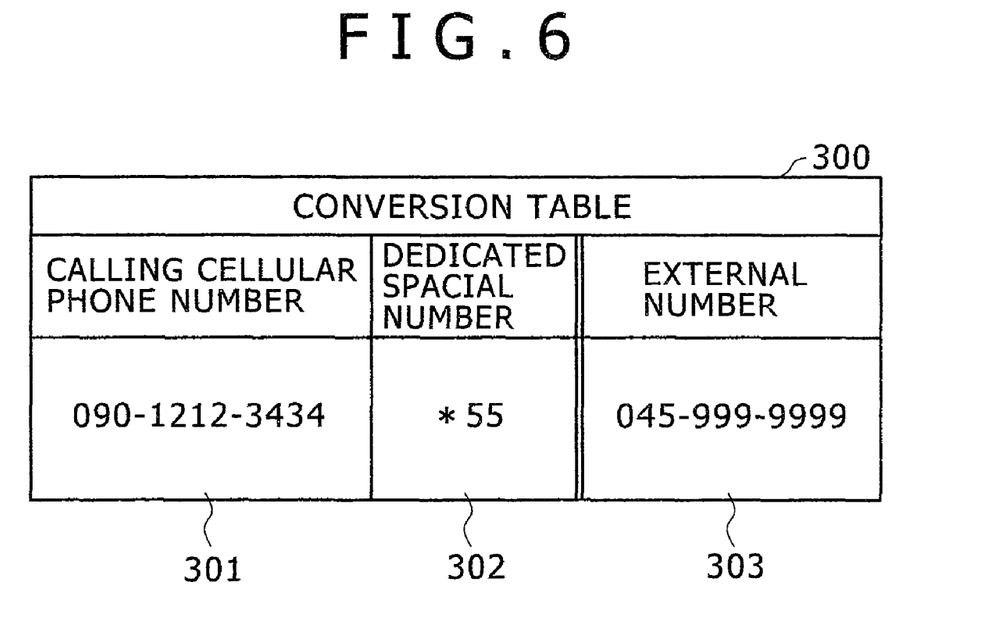
FIG. 6 is an illustration for explaining a conversion table for converting a cellular phone number of a caller and a WOS dedicated special number into a PBX external number.

An embodiment related to a number conversion in a mobile switching controller will further be described hereinbelow with reference to FIGS. 6 and 7. FIG. 6 is an illustration for explaining a conversion table for converting a cellular phone number of a caller and a WOS dedicated special number into a PBX external number, and FIG. 7 is an illustration of a sequence among a cellular phone, a mobile switching controller, a PBX and an internal phone.

In FIG. 6, a conversion table 300 is composed of a calling cellular phone number 301, a dedicated special number 302 and an external number 303. The conversion table 300 is placed in advance in a mobile switching controller 160. The effect is that, upon acquisition of "*55" from the calling cellular phone number "090-1212-3434", the mobile switching controller 160 can convert "*55" into "045-999-9999" to make connection to the PBX 130.

Figure 7:
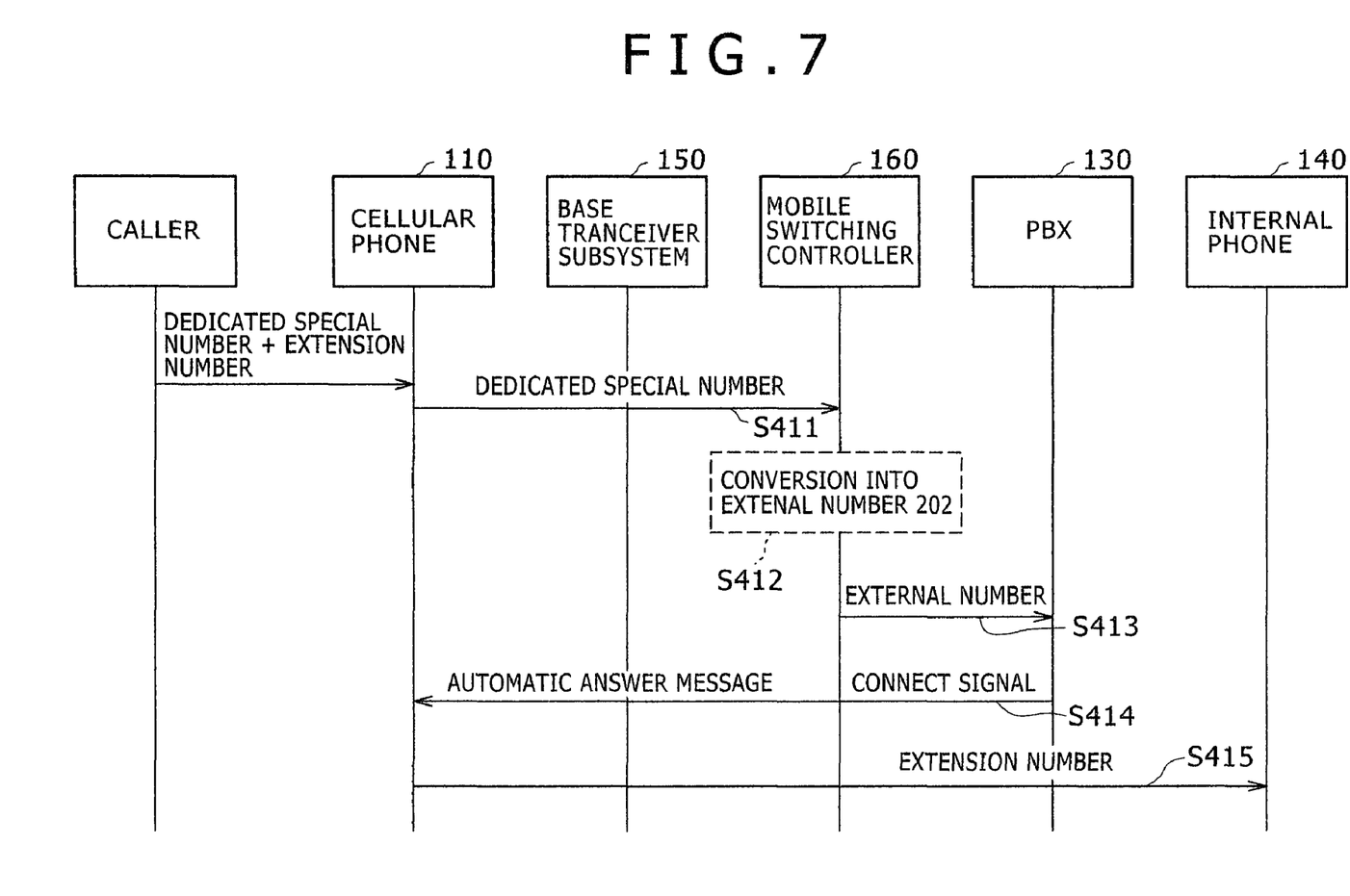
FIG. 7 is an illustration of a sequence among a cellular phone, a base transceiver subsystem, a mobile switching controller, a PBX and an internal phone.

In FIG. 7, in a case where connection is made from the cellular phone 110 outside the WOS system service area to the internal phone 140, the caller possessing the cellular phone 110 dials the dedicated special number 210 (*55) and the extension number 211 (4111). At the dialing, the extension number 211 is stored in the internal memory 101 of the cellular phone 110. The signal sent from the cellular phone 110 is transmitted through the base transceiver subsystem 150 to the mobile switching controller 160 (S411). Through the use of the conversion table 300 in the mobile switching controller 160, conversion is made from the dedicated special number 210 (*55) and the cellular phone number 215 (090-1212-3434) of the caller into the external number 220 (045-999-9999) (S412), thus establishing connection to the PBX 130 (S413). The PBX 130 transmits a CONNECT signal 222 to the cellular phone 110 (S414). After the reception of the CONNECT signal 222, the cellular phone 110 automatically transmits the extension number 211 stored in the internal memory 101 of the cellular phone 110, thereby calling the internal phone 140 and establishing connection thereto (S415). In this embodiment, the cellular phone 110 notifies the caller number.

According to this embodiment, a conversion table is collectively placed in a mobile switching controller, which facilitates the updating of the conversion table.

The present invention enables a caller to use the same number for connection to an internal phone and to conduct the same calling operation irrespective of whether a cellular phone is inside or outside a WOS system service area.

We claim:

1. A method for using a cellular phone which is registered to a base transceiver subsystem for a wireless office system (WOS) being connected to a private branch exchange for internal telephone exchange, has an internal telephone number, and operates as an internal phone within a cover area of the base transceiver subsystem for the WOS by inputting a dedicated special number and an extension number, the method comprising the steps of:

preparing a conversion table including information for converting the dedicated special number to an external phone number of the private branch exchange;

preparing a region for storing the extension number entered by a user following to the dedicated special number, storing the extension number in the region in response to input of the dedicated special number and the extension number;

establishing a speech path, in a case where the cellular phone is located within the cover area of the base transceiver system, via said base transceiver subsystem for the WOS and said private branch exchange; and in a case where the cellular phone is located outside of the cover area of the base transceiver system for the WOS, receiving a response which indicates not connectable from a mobile switching controller in response to the dedicated special number, converting the dedicated special number into the external phone number with reference to the conversion table, transmitting the external phone number to the mobile switching controller, and transmitting the stored extension phone number in response to connecting to the private branch exchange.

2. A cellular phone which is registered to a base transceiver subsystem for a wireless office system (WOS) being connected to a private branch exchange for internal telephone exchange, has an internal telephone number, and operates as an internal phone within a cover area of the base transceiver subsystem for the WOS by inputting a dedicated special number and an extension number, said cellular phone comprising:

a transceiver unit for carrying out transmission and reception of a radio signal;

a speaker for audio reception;

a microphone for audio transmission;

a phone number inputting unit;

a display unit;

an internal memory; and a control circuit for controlling said transceiver unit, said speaker, said microphone, said inputting unit, said display unit and said internal memory, which are coupled to said control circuit, wherein said internal memory stores a conversion table for converting the dedicated special number into an external number of the private branch exchange, wherein said control circuit receives the dedicated special number and the extension number from the phone number inputting unit, stores the extension number in the internal memory, and transmits the dedicated special number via the transceiver unit, in a case where the cellular phone is located outside of the cover area of the base transceiver subsystem for the WOS, said control circuit establishes a speech path via said base transceiver subsystem for the WOS and said private branch exchange, in a case where the cellular phone is located outside of the cover area of the base transceiver subsystem for the WOS, said control circuit receives a response which indicates not connectable from a mobile switching controller in response to the dedicated special number, converts the dedicated special number into the external number by referring to the conversion table, transmits the external number to the mobile switching controller, connects to the private branch exchange, and transmits the extension number to the private branch exchange, said cellular phone establishes connection to an in-office internal phone in a manner that, irrespective of whether or not the cellular phone exists within the cover area.

* * * * *